No. 853,418. PATENTED MAY 14, 1907.
H. NEUBERT.
SPRING WHEEL.
APPLICATION FILED FEB. 4, 1907.
2 SHEETS—SHEET 1.
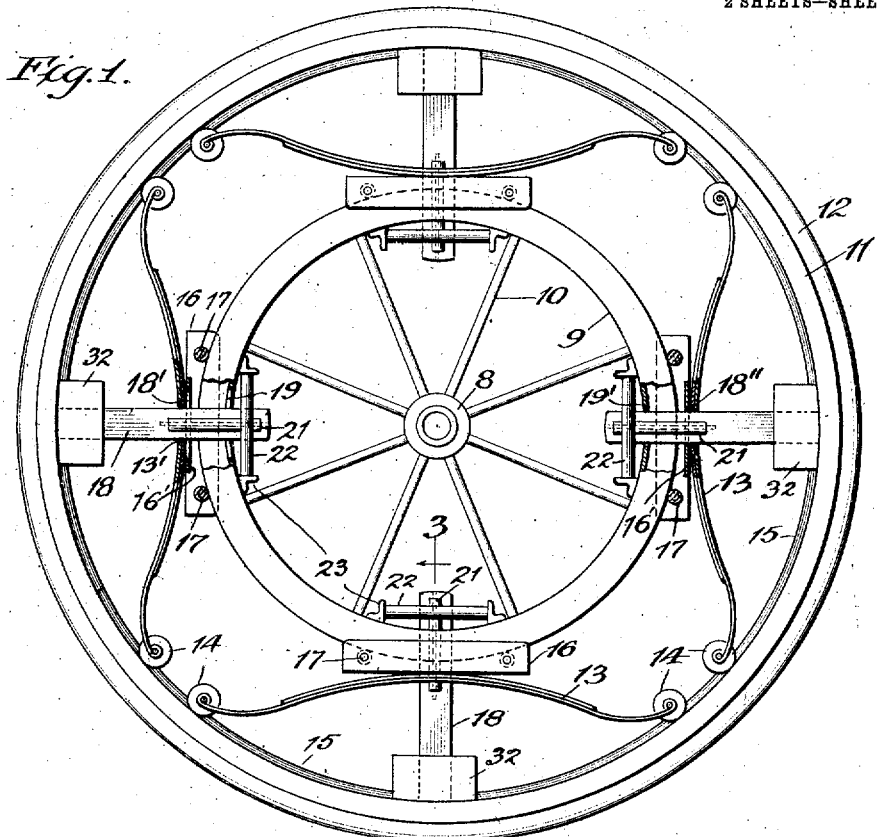
Witnesses
Harry R. L. White
M. A. Kiddie
Inventor
Henry Neubert
By Wm. T. Belt
Atty.

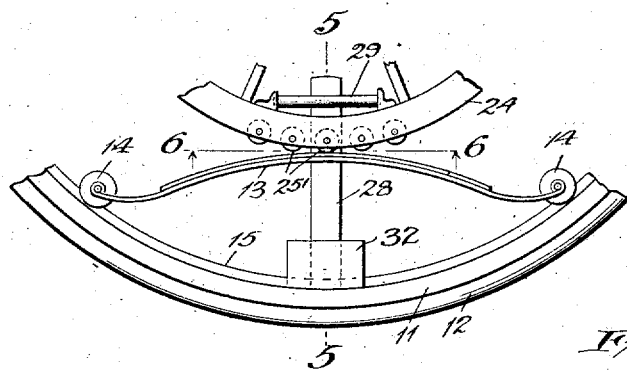
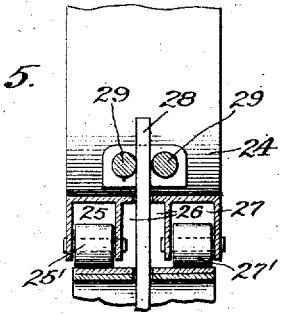
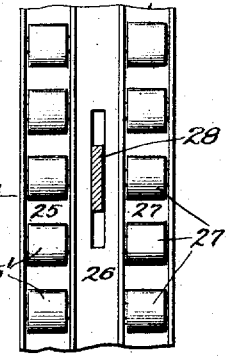
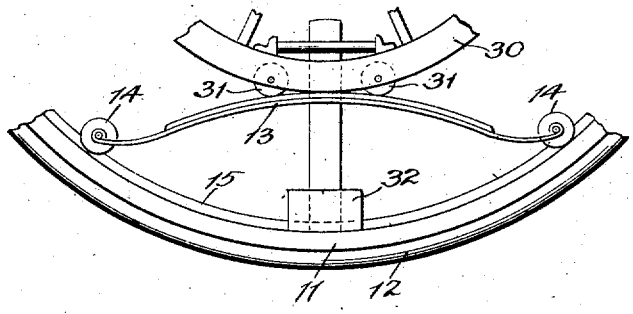

UNITED STATES PATENT OFFICE.

HENRY NEUBERT, OF CHICAGO, ILLINOIS.

SPRING-WHEEL.

No. 853,418.  Specification of Letters Patent.  Patented May 14, 1907.

Application filed February 4, 1907. Serial No. 355,631.

*To all whom it may concern:*

Be it known that I, HENRY NEUBERT, a citizen of the United States, residing at Chicago, in the county of Cook and State of Illinois, have invented new and useful Improvements in Spring-Wheels, of which the following is a specification.

The object of this invention is to provide a resilient wheel for vehicles to be used in place of wheels having inflated or cushioned rubber tires.

The invention is particularly adapted for automobiles and other motor vehicles but it can be used on other vehicles which are ordinarily equipped with metal or solid rubber tires and with equally satisfactory results.

The invention embodies a wheel having its rim spring supported with respect to its hub, the cushion or spring being located between the rim and the felly. The cushion or spring absorbs shocks and jolts due to inequalities of the road and thereby to a very large extent serves to prevent injury to the vehicle.

In the accompanying drawings Figure 1 is a side elevation of a wheel embodying the invention and showing certain parts in section to more clearly illustrate the construction; Fig. 2 is a detail view of a portion of the felly as seen by one looking from the direction of the hub at the rollers which guide the guide bar; Fig. 3 is a sectional view on the line 3—3 of Fig. 1; Fig. 4 is a detail view of a portion of a wheel illustrating another embodiment of the invention in elevation; Fig. 5 is a sectional view on the line 5—5 of Fig. 4; Fig. 6 is a sectional view on the line 6—6 of Fig. 4; Fig. 7 is a detail view of a portion of a wheel showing another embodiment of the invention.

In the drawings 8 is the hub of the wheel, 9 the felly, 10 the spokes fitted in the hub and felly, 11 the rim and 12 the solid rubber tire. A plurality of semi-elliptical leaf springs 13 are located between the felly and the rim and the ends of these springs carry rollers 14 which bear upon the inner side of the rim. The rim is provided with a guide rib 15 and the rollers 14 are grooved to fit on said rib, thereby holding the rollers in proper operative position on the rim. A shoe 16 is interposed between each spring and the felly and this shoe is preferably made of channel iron with its flanges extending inwardly and partly inclosing the felly. The felly bears against rollers 17 carried by the shoe in its channel and the back 16' of the shoe bears against the spring. The felly 9 is preferably made of single channel iron (Fig. 3) with its flanges extending outwardly and engaging the rollers 17, but I may make this felly solid of wood or metal or as pointed out hereinafter.

Guide bars 18 are fastened to the rim 15 and project inwardly and radially through slots in the spring, the shoe and the felly. The slot 18' in the shoe and the slot 19 in the felly are elongated, that is to say are longer than the width of the guide bar to permit the shoe and the felly to move relatively to and laterally on the guide bar. However, I prefer that the slots 18'' and 19'' for one of the guide bars be of just sufficient size, like the slot 13' in the spring, to permit a free in and out movement of the shoe and the felly on that guide bar but no lateral movement. This is shown in section at the right of Fig. 1. Each guide bar has a longitudinal slot 20 in which is located a roller 21 extending lengthwise to the guide bar and through the spring, the shoe and the felly. This roller extends inward between and in bearing contact with a pair of rollers 22 which are pivotally mounted in brackets 23 on the inner side of the felly (Fig. 2). The construction is such that the felly, the shoes and the springs can move longitudinally on the guide bars and the felly and the shoes can move laterally on all the guide bars except one. In the construction of Figs. 4, 6, the felly 24 is made with three channels 25, 26, 27 and a plurality of rollers 25' and 27' are journaled in bearings in the channels 25 and 27 to bear on the spring. The guide bar 28 projects inward through the channel 26, and simply for the purpose of illustrating a variation in the embodiment of my invention, I have omitted the longitudinal roller on the guide bar and shown this guide bar in direct engagement with the parallel rollers 29.

In the construction of Fig. 7 the felly 30 is made of single channel iron and two rollers 31 are journaled in bearings in the felly and bear upon the spring. I have also omitted the longitudinal roller on the guide bar from Fig. 7 and it will be observed that the embodiments of the invention illustrated in Figs. 4-7 do not have the shoes between the felly and springs.

I prefer to provide a cushion or buffer 32 at the outer end of each guide bar to receive the spring if it should be forced down so far, and this cushion or buffer can be made of rubber or other material or in any suitable manner.

My invention provides a resilient wheel of strong and substantial construction which is especially adapted for heavy work. The weight on the axle is shifted from one spring to another imperceptibly and the construction and arrangement of parts is such that shocks or jolts due to inequalities of the road are entirely absorbed, thereby greatly reducing the wear and tear on the vehicle, practically eliminating the danger of broken wheels and axles and relieving the load, whether passengers or freight, of jolts and jars.

What I claim and desire to secure by Letters Patent is:

1. A spring wheel comprising a rim having a longitudinal rib on its inner side, a central structure, a plurality of semi-elliptical springs located between the rim and central structure, and rollers on the ends of said springs, said rollers being grooved to fit said rib.

2. A spring wheel comprising a central structure including a hub and a felly, the latter having elongated longitudinal slots therein, a rim, a plurality of semi-elliptical springs located between the felly and rim and provided with slots, and guide bars secured to the rim and extending radially to the wheel through said slots in the springs and felly.

3. A spring wheel comprising a central structure including a hub and a slotted felly, a rim, a plurality of semi-elliptical springs located between the felly and rim and provided with slots, and radial guide bars secured at their outer ends to the rim and extending through the slots in the springs and felly, the slots in the felly being elongated to permit lateral movement of the felly on the guide bars and the slots in the springs being made to permit free movement of the springs longitudinally on the guide bars.

4. A spring wheel comprising a central structure including a hub and a slotted felly, a rim, a plurality of springs between the felly and rim having slots, rollers on the felly at the side edges of the slots, and radial guide bars secured at their outer ends to the rim and extending through the slots in the springs and felly and between said rollers.

5. A spring wheel comprising a central structure including a hub and a slotted felly, a rim, a plurality of springs between the felly and rim and having slots, radial guide bars secured at their outer ends to the rim and extending through the slots in the springs and felly, and longitudinal rollers carried by the guide bars to operate in said slots.

6. A spring wheel comprising a central structure including a hub and a slotted felly, a rim, a plurality of springs between the felly and rim and having slots, rollers on the felly at the side edges of the slots, radial guide bars secured at their outer ends to the rim and extending through the slots in the springs and felly and between said rollers, and a longitudinal roller carried by each guide bar in said slots.

7. A spring wheel comprising a central structure including a hub and a slotted felly, a rim, a plurality of slotted semi-elliptical springs located between the felly and rim, radial guide bars secured to the rim and extending through the slots in the springs and felly, and a shoe interposed between the felly and each spring.

8. A spring wheel comprising a central structure including a hub and a slotted felly, a rim, a plurality of slotted semi-elliptical springs located between the felly and rim, radial guide bars secured to the rim and extending through the slots in the springs and felly, a shoe interposed between the felly and each spring, and rollers carried by said shoe and operating against the felly.

9. A spring wheel comprising a central structure including a hub and a slotted felly, a rim, a plurality of slotted semi-elliptical springs located between the felly and rim, rollers on the felly at the side edges of the slots therein, slotted shoes interposed between the springs and the felly, rollers carried by said shoes and operating against the felly, and radial guide bars secured at their outer ends to the rim and extending through the slots in the springs, shoes and felly and between said rollers.

HENRY NEUBERT.

Witnesses:
M. A. KIDDIE,
WM. O. BELT.